United States Patent
LeFevre et al.

(10) Patent No.: US 10,503,718 B2
(45) Date of Patent: Dec. 10, 2019

(54) PARALLEL TRANSFERS OF ELECTRONIC DATA

(71) Applicant: Hewlett Packard Enterprise Development LP, Houston, TX (US)

(72) Inventors: Jeffrey LeFevre, Sunnyvale, CA (US); Maria Castellanos, Sunnyvale, CA (US); Meichun Hsu, Sunnyvale, CA (US); Rui Liu, Sunnyvale, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 387 days.

(21) Appl. No.: 15/203,451

(22) Filed: Jul. 6, 2016

(65) Prior Publication Data

US 2018/0011886 A1    Jan. 11, 2018

(51) Int. Cl.
*G06F 16/22* (2019.01)
*G06F 16/23* (2019.01)

(52) U.S. Cl.
CPC ...... *G06F 16/2282* (2019.01); *G06F 16/2365* (2019.01); *G06F 16/2379* (2019.01)

(58) Field of Classification Search
CPC ......... G06F 17/30371; G06F 17/30339; G06F 16/2282; G06F 16/2365
USPC ......................................... 707/703
See application file for complete search history.

(56) References Cited

U.S. PATENT DOCUMENTS

| | | | |
|---|---|---|---|
| 4,638,227 A * | 1/1987 | Katayama | G05B 19/4067 318/565 |
| 6,920,537 B2 * | 7/2005 | Ofek | G06F 11/1458 707/999.202 |
| 7,103,590 B1 * | 9/2006 | Murthy | G06F 16/24553 |
| 7,548,898 B1 * | 6/2009 | Tarenskeen | G06F 16/214 |
| 8,606,744 B1 * | 12/2013 | Dageville | G06F 16/25 707/602 |
| 8,635,183 B1 * | 1/2014 | Rakshit | G06F 19/3418 706/62 |
| 10,135,734 B1 * | 11/2018 | Singh | H04L 45/7453 |

(Continued)

OTHER PUBLICATIONS

"Amazon Redshift-Data Warehouse Solution—AWS", retrieved from the Internet on Jul. 6, 2018, 11 pages. <https://aws.amazon.com/redshift/>.

(Continued)

*Primary Examiner* — Shahid A Alam
*Assistant Examiner* — Nargis Sultana

(57) ABSTRACT

Examples disclosed herein relate to parallel transfers of electronic data. Some examples disclosed herein may include executing, by a processing node of a computation engine, a computation task among a plurality of computation tasks generated by the computation engine for transferring an electronic data table to a target table. The computation task, when executed by the processing node, may cause the processing node to transfer a segment of the electronic data table to a staging table, update a task status table upon completing the transfer of the segment to the staging table, in response to determining that the plurality of computation tasks have completed, update a last committer table with a task identifier associated with the computation task, and in response to determining that the last committer table includes the task identifier associated with the computation task, transfer the staging table to the target table.

19 Claims, 5 Drawing Sheets

(56) References Cited

U.S. PATENT DOCUMENTS

| | | | | | |
|---|---|---|---|---|---|
| 2001/0049751 | A1* | 12/2001 | Nakamura | ................ | G06F 9/54 |
| | | | | | 719/313 |
| 2003/0026031 | A1* | 2/2003 | Bickers | ................ | G06F 3/0613 |
| | | | | | 360/72.2 |
| 2005/0075949 | A1* | 4/2005 | Uhrig | ................... | G06Q 10/087 |
| | | | | | 705/28 |
| 2005/0187991 | A1* | 8/2005 | Wilms | ................... | G06F 16/254 |
| 2007/0226342 | A1* | 9/2007 | Apelbaum | .......... | H04L 67/1008 |
| | | | | | 709/226 |
| 2008/0013803 | A1* | 1/2008 | Lo | ...................... | G06K 9/00067 |
| | | | | | 382/124 |
| 2010/0082543 | A1* | 4/2010 | Nagarajan | ............. | G06F 3/0605 |
| | | | | | 707/640 |
| 2010/0186020 | A1* | 7/2010 | Maddhirala | ........... | G06F 9/5038 |
| | | | | | 718/105 |
| 2014/0207999 | A1* | 7/2014 | Benhase | ............... | G06F 12/121 |
| | | | | | 711/103 |
| 2015/0046412 | A1* | 2/2015 | Arthanat | ................. | G06F 16/25 |
| | | | | | 707/694 |
| 2016/0132357 | A1* | 5/2016 | Kuraishi | ............... | G06F 9/5038 |
| | | | | | 718/101 |

OTHER PUBLICATIONS

"Amazon Simple Storage Service", retrieved from the Internet on Jul. 6, 2018, 26 pages. <https://aws.amazon.com/s3/>.

"DataStax Cassandra Connector", retrieved from the Internet on Jul. 6, 2018, 6 pages. <https://github.com/datastax/spark-cassandra-connector>.

"JavaPMML API", GitHub, Retrieved from the Internet on Jul. 6, 2018, 5 pages. <https://github.com/jpmml>.

"PMML 4.1 general structure", Retrieved from the Internet on Jul. 6, 2018, 9 pages. <http://dmg.org/pmml/v4-1/GeneralStructure.html>.

"Redshift data source for Spark", Retrieved from the Internet on Jul. 6, 2018, 14 pages. <https://github.com/databricks/spark-redshift>.

"Spark MLlib", retrieved from the Internet on Jul. 6, 2018, 4 pages. <http://spark.apache.org/mllib/>.

"Spark PMML model export", Retrieved from the Internet on Jul. 6, 2018, 2 pages. <https://spark.apache.org/docs/latest/mllib-pmml-model-export.html>.

Lakshman, et al., "Cassandra: A decentralized structured storage system". SIGOPS Oper. Syst. Rev., 44(2), Apr. 2010, 6 pages.

Lamb, et al., "The Vertica analytic database: C-store 7 years later", 2012, 12 pages.

Avro, "Apache Avro data serialization" retrieved from the Internet on Jul. 6, 2018, 17 pages.

Dean, et al., "MapReduce: Simplified data processing on large clusters", OSDI 2004, 13 pages.

Stonebraker, et al., "C-store: A Column-oriented DBMS", 2005, 12 pages.

Zaharia, et al., "Resilient distributed datasets: A fault-tolerant abstraction for in-memory cluster computing", 2012, 14 pages.

Zaharia, et al, "Spark: Cluster computing with working sets", 2010, 7 pages.

Prasad, et al., "Large-scale predictive analytics in vertica: Fast data transfer, distributed model creation, and in-database prediction", 2015, 12 pages.

Sarah, "Introducing the Connector for Apache Spark", myVertica, Vertica Blog, Sep. 26, 2016, 8 pages.

\* cited by examiner

PARALLEL TRANSFERS OF ELECTRONIC DATA

BACKGROUND

Databases organize and store electronic data. The electronic data may be stored in various storage schemas such as tables, trees, objects, reports, views, etc. Systems and users may interact with databases and the electronic data stored therein. For example, computation engines that can perform various computations on the electronic data may read and store electronic data in databases.

BRIEF DESCRIPTION OF THE DRAWINGS

The following detailed description references the drawings, wherein.

DETAILED DESCRIPTION

Figure 1:
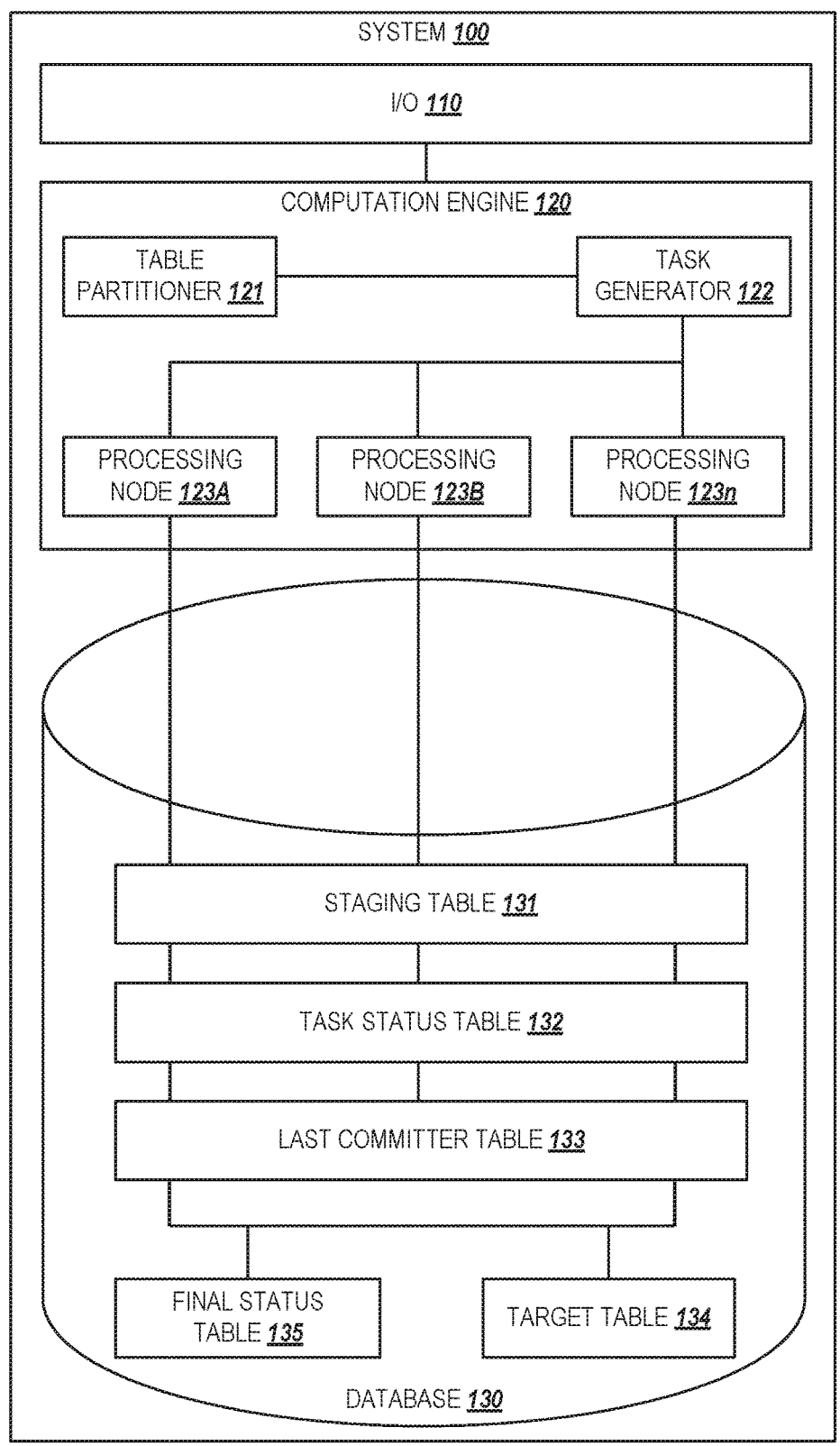
FIG. 1 is a block diagram of an example system for parallel transfers of electronic data.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

Databases organize and store electronic data. Tables of electronic data may be transferred to a database using various techniques. One technique includes executing a single computation task on a single processing node so that the processing node transfers an electronic data table to a database. This technique is simple but can result in long transfer times because the entire electronic data table is serially transferred to the database.

Another technique includes distributing portions of the electronic data table across a plurality of computation tasks so that a plurality of computation engine nodes can transfer portions of the electronic data table to the database in parallel. This results in a faster transfer of the electronic data table but can result in added complexities. For example, parallel tasks need to be coordinated to ensure all the data in the electronic data table are transferred to the database with atomicity, consistency, isolation, and durability (ACID). In some computation engines, tasks are stateless and cannot communicate with each other, and therefore a third-party system and/or process (e.g., a global transaction manager, parallel job coordinator, etc.) is used to coordinate the tasks. However, using a third-party system and/or process to coordinate parallel tasks adds complexity to the system by adding additional system components and processes.

Examples disclosed herein describe technical solutions to these technical challenges by providing systems, methods, and computer-readable media for parallel transfers of electronic data. In the disclosed examples, a computation engine may generate tasks that are capable self-coordinating without the use of communication between tasks and without the use of third-party systems and/or processes.

In some examples, a computation engine may receive an electronic data table and an identification of a target table in a database. Based on the received electronic data table and target table identification, the computation engine may partition the received electronic data table into segments and generate a plurality of computation tasks to transfer the segments to the identified target table. The computation engine may also generate a plurality of transfer tables, including a staging table, a task status table, a last committer table, and a final status table. Each computation task may be generated such that, when executed by a processing node of the computation engine, cause the processing node to transfer a segment of the electronic data table to the staging table and set its task status in the task status table to complete. After each computation task completes its segment transfer and updates the task status table, each computation task may check the task status table to determine whether all computation tasks have completed. In response to determining that all segment transfers are complete, the computation tasks may attempt to update the last committer table with their assigned task identifier. Each computation task may check the last committer table to determine if they were successful in writing their task identifier to the last committer table. If not, the computation task may terminate. If so, the computation task may become the last committer task and transfer the staging table to the target table. The last committer task may update the final status table to reflect that the transfer of the staging table to the target table is complete.

FIG. 1 is a block diagram of an example system 100 for parallel transfers of electronic data. System 100 may be implemented by a single computing system or a plurality of computing systems. A computing system, as used herein, may be any type of computing system including, but not being limited to: a laptop, a desktop, an all-in-one device, a thin client, a workstation, a tablet computer, a mobile device, a network-enabled appliance (e.g., a "Smart" television), an Internet of Things (IoT) sensor, a server device, and a storage device.

As shown in FIG. 1, system 100 may include a number of components such as an input/output (I/O) 110, a computation engine 120, and a database 130. The number and arrangement of these components is an example only and provided for purposes of illustration. Other arrangements and numbers of components may be utilized without departing from the examples of the present disclosure.

I/O 110 may receive electronic data tables and target table identifications, and provide the electronic data tables and target table identifications to computation engine 120. In some examples, I/O 110 may be implemented as an I/O device that provides users with the capability to provide electronic data tables as input to the I/O device. Examples of I/O devices may include physical keyboards, virtual touch-screen keyboards, mice, joysticks, styluses, etc. In some examples, I/O 110 may be implemented as a communications interface (e.g., USB, IEEE 1394, DisplayPort, DVI, HEMI, VGA, Serial port, PCI, PCI-E, SATA, I²C, SCSI, optical communications interfaces, etc). In some examples, I/O 110 may be implemented as a wired or wireless networking interface (e.g., Ethernet, Wi-Fi, Bluetooth, Near Field Communication, etc.). In such examples, the electronic data tables and target table identifications may be received at I/O 110 via a network (not shown) such as the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or any other type of network(s). In some examples, I/O 110 may be implemented as an application programming interface (API).

Computation engine 120 may be implemented as a stand-alone computing system or computing systems, or may be implemented as a combination of electronic circuitry (i.e., hardware) and software/firmware included in the computing system of system 100 that implements the functionality of computation engine 120. For example, computation engine 120 may be implemented partially or fully in a central processing unit (CPU), in a dedicated integrated circuit such as an ASIC (application-specific integrated circuit), or in a dedicated FPGA (field-programmable gate array) of system 100 that executes instructions (e.g., stored on a machine-readable storage medium of system 100) to offer the functionality of computation engine 120.

Computation engine 120 may be a parallel computation engine capable of executing computation tasks in parallel. Computation engine 120 may be an Apache® Spark™ cluster, an Apache® Hadoop™ cluster, a High-Performance Computing Cluster (HPCC), a Cluster Map Reduce (CMR) cluster, or another cluster computing framework. Computation engine 120 may include a table partitioner 121, task generator 122, and processing nodes 123A-123n. Each of these components may be implemented as a combination of hardware and software/firmware as described above regarding computation engine 120 generally.

Table partitioner 121 may partition electronic data tables into segments. The electronic data tables may be received at I/O 110 from applications or subsystems of system 100, other systems, and from users. Table partitioner 121 may partition electronic data table into a number of segments based on various factors. Example factors include electronic data table size (i.e., the amount of data included in the electronic data table) and the number of processing nodes 123A-123n included in computation engine 120.

Task generator 122 may generate and assign computation tasks to processing nodes 123A-123n. The computation tasks may be generated such that, when executed by processing nodes 123A-123n, the computation tasks cause processing nodes 123A-123n to transfer segments of electronic data tables created by table partitioner 121 to database 130. Task generator 122 may assign a job identifier to the collection of computation tasks generated to transfer an electronic data table. Each job identifier may be unique to each electronic data table transfer.

The computation tasks may be assigned to processing nodes 123A-123n based on various factors. The factors may include the availability of processing nodes 123A-123n, the workloads on processing nodes 123A-123n, etc. For examples, task generator 122 may assign a computation task to processing node 123A if processing node 123A has the lowest workload among processing nodes 123A-123n. As another example, task generator 122 may assign a computation task to processing node 123A if processing nodes 123B-123n are not available to process new computation tasks.

Processing nodes 123A-123n may execute computation tasks assigned by task generator 122. The computation tasks, when executed by processing nodes 123A-123n, may cause processing nodes 123A-123n to transfer segments of electronic data tables to target tables stored in database 130. While processing nodes 123A-123n are shown in FIG. 1 as being included in computation engine 120, processing nodes 123A-123n may be implemented as standalone computing systems for executing the functions described herein with respect to processing nodes 123A-123n.

Database 130 may be implemented by any database capable of storing electronic data tables and may be accessed using methods such as data entry, data transfer, data uploading, etc. In some examples, database 130 may be implemented as a relational database, a parallel database (or massively parallel database), a distributed database, a centralized database, a column-oriented database, or a combination thereof. Database 130 may be included in a standalone computing system(s) and communicatively coupled to computation engine 120 via a network (not shown) or may be implemented as a combination of electronic circuitry (i.e., hardware) and software/firmware included in the computing system of system 100 that implements the functionality of database 130.

Computation engine 120 may generate various tables in order to transfer electronic data tables to target tables in database 130 (such as target table 134). For example, computation engine 120 may generate a staging table 131, a task status table 132, a last committer table 133, and a final status table 135. While tables 131-133 and 135 are shown in FIG. 1 as being included in database 130, these tables may be included in another database in system 100, in a database in another system, or in a standalone database system.

Staging table 131 may be a table where segments of an electronic data table are stored prior to being transferred to target table 134. Staging table 131 may have the same or similar schema as target table 134. Using staging table 131 to temporarily store segments of electronic data tables instead of transferring table segments directly to target table 134 isolates database 130 from errors that may occur during the transfer. For example, if a threshold number of errors occur during the transfers of segments to staging table 131, then the data stored in staging table 131 are not transferred to target table 134 and are instead discarded, thereby ensuring an ACID transaction.

Task status table 132 may include information associated with each computation task generated by task generator 122. Each row included in task status table 132 may be assigned to a computation task. Each row may include a computation task identifier, an identifier of a segment associated with the computation task, number of rows inserted into staging table 131 by the computation task, number of errors that occurred during the transfer of the segment, and a computation task status. An error may occur when a row of data in a segment fails to transfer to staging table 131. The computation task status may indicate whether the computation task is complete or incomplete. A computation task may be identified as "Incomplete" if the segment of an electronic data assigned to the computation task has not been fully transferred to staging table 131. Conversely, a computation task may be identified as "Complete" if the segment of an electronic data assigned to the computation task has been fully transferred to staging table 131.

Last committer table 133 may be used to assign a computation task as a last committer task. The last committer task may be the computation task responsible for transferring staging table 131 to target table 134. Last committer table 133 may include a task identifier field. The task identifier field may be a field that is updated by a processing node to reflect an identifier of a computation task. If a computation task's identifier is included in the task identifier field, then the computation task becomes the last committer task. Processing nodes 123A-123n may check the task identifier field in last committer table 133 to determine whether the computation task assigned to the processing node is the last committer task.

Final status table 135 may track the transfer status of electronic data tables to target table 134. The computation task that is the last committer task may update final status table 135 with information associated with each transfer. The information may include an identifier for the transfer (i.e., the job identifier), a number of errors for each transfer, and a final status for each transfer. The number of errors for a transfer may be defined as the number of rows in the electronic data table that failed to be transferred to staging table 131. Accordingly, the number of errors included in final status table 135 may be the aggregated number of errors for each segment transferred to staging table 131 identified in task status table 132. The final status of a transfer may indicate whether staging table 131 was successfully or unsuccessfully transferred to target table 134.

Processing nodes 123A-123n, when executing an assigned computation task, may transfer a segment of an electronic data table (e.g., an electronic data table received at I/O 110) to staging table 131 and update task status table 132 to reflect the status of the transfer. In some examples, the computation tasks may cause processing nodes 123A-123n to encode the segments in a file format (e.g., Avro, Protocol Buffers, Thrift, etc.) that allows for compression of the data in the segments before transferring the segments to staging table 131.

To transfer electronic data table segments, each of processing nodes 123A-123n may add rows of data included in the segments to staging table 131. To update task status table 132, each of processing nodes 123A-123n may identify the row associated with the computation task assigned to the processing node and determine the status of the computation task in task status table 132. If the status of the assigned computation task is "Incomplete," the processing node may update the number of errors that occurred in the segment transfer (e.g., by increasing the number of errors by 1) and may update the status to "Complete." If the processing node determines that the status of the assigned computation task is already "Complete," the processing node may abort the transfer by deleting the transferred rows from staging table 131 and may terminate the computation task. Tracking the status of each computation task using task status table 131 ensures an ACID transfer of the electronic data table by preventing duplicate transfers of electronic data table segments to staging table 131. Accordingly, if a computation task becomes duplicated or restarted after completing, any duplicated transfers can be undone before staging table 131 is transferred to target table 134.

Once a processing node executing a computation task completes its segment transfer to staging table 131 and updates task status table 132, the processing node may check the status of all computation tasks in task status table 132 to determine whether all computation tasks have completed. If the processing node determines that all computation tasks have not completed, the processing node may terminate its assigned computation task and no further action may be taken by the processing node.

If, however, the processing node determines, based on task status table 132, that all computation tasks have completed, the processing node may attempt to update last committer table 133 with the identifier associated with the computation task assigned to the processing node. In attempting to update last committer table 133, the processing node may determine whether the task identifier field of last committer table 133 already includes an identifier of another computation task. If the processing node determines that the task identifier field of last committer table 133 already includes an identifier of another computation task, the processing node may terminate the assigned computation task and no further action may be taken by the processing node.

If the processing node determines that the task identifier field of last committer table 133 is empty, the processing node may update the task identifier field of last committer table 133 with the identifier associated with the computation task assigned to the processing node. The processing node may then read back the task identifier field to determine whether it was successful in writing the assigned computation task identifier to the task identifier field of last committer table 133. If unsuccessful, the processing node may terminate the assigned computation task and no further action may be taken by the processing node. If successful, the assigned computation task becomes the last committer task and is responsible for transferring staging table 131 to target table 134 and updating final status table 135 with the status of the transfer.

The computation task that is the last committer task may, when executed by the processing node to which it is assigned, cause the processing node to transfer staging table 131 to target table 134. The last committer task may identify target table 134 based on the target table identifier received at I/O 110. The target table identifier may include, for example, an Internet Protocol (IP) address associated with target table 134, hash values for boundaries of target table 134, or other identifiers.

The last committer computation task may, when executed by the processing node to which it is assigned, cause the processing node to transfer staging table 131 to target table 134 if the number of errors in staging table 131 is less than a threshold number of errors. The threshold number of errors may be determined based on various factors. Example factors include a type of data included in the electronic data table, a priority of the data included in the electronic data table, system administrator requirements, and customer requirements. The processing node may determine the number of errors in staging table 131 by reading the number of errors from each row included in staging table 131 and aggregating the number of errors. The processing node may compare the aggregated number of errors to the threshold number of errors and proceed with transferring staging table 131 to target table 134 when the aggregated number of errors is less than the threshold number of errors. Conversely, the processing node may abort the transfer of staging table 131 to target table 134 when the aggregated number of errors is greater than or equal to the threshold number of errors, thereby ensuring that corrupted data is not written to database 130.

In some examples, transferring staging table 131 to target table 134 may include replacing or overwriting target table 134 with staging table 131. The processing node may overwrite target table 134 by deleting target table 134 and renaming staging table 131 to be the name of target table 134. In some examples, transferring staging table 131 to target table 134 may include appending the data included in staging table 131 to target table 134. The processing node may append the data included in staging table 131 to target table 134 by coping the rows of data included in staging table 131 and pasting them into target table 134.

The last committer computation task may, when executed by the processing node to which it is assigned, cause the processing node to update final status table 135 to reflect the status of the transfer of staging table 131 to target table 134. The status may include the identifier for the transfer (i.e., the job identifier), a number of errors that occurred during the transfer, and the final status of the transfer. The processing node may terminate the last committer computation task upon updating final status table 135. In some examples, the processing node may delete staging table 131, task status table 132, and last committer table 133 after updating final status table 135 with the status of the transfer of staging table 131 to target table 134.

Figure 2:
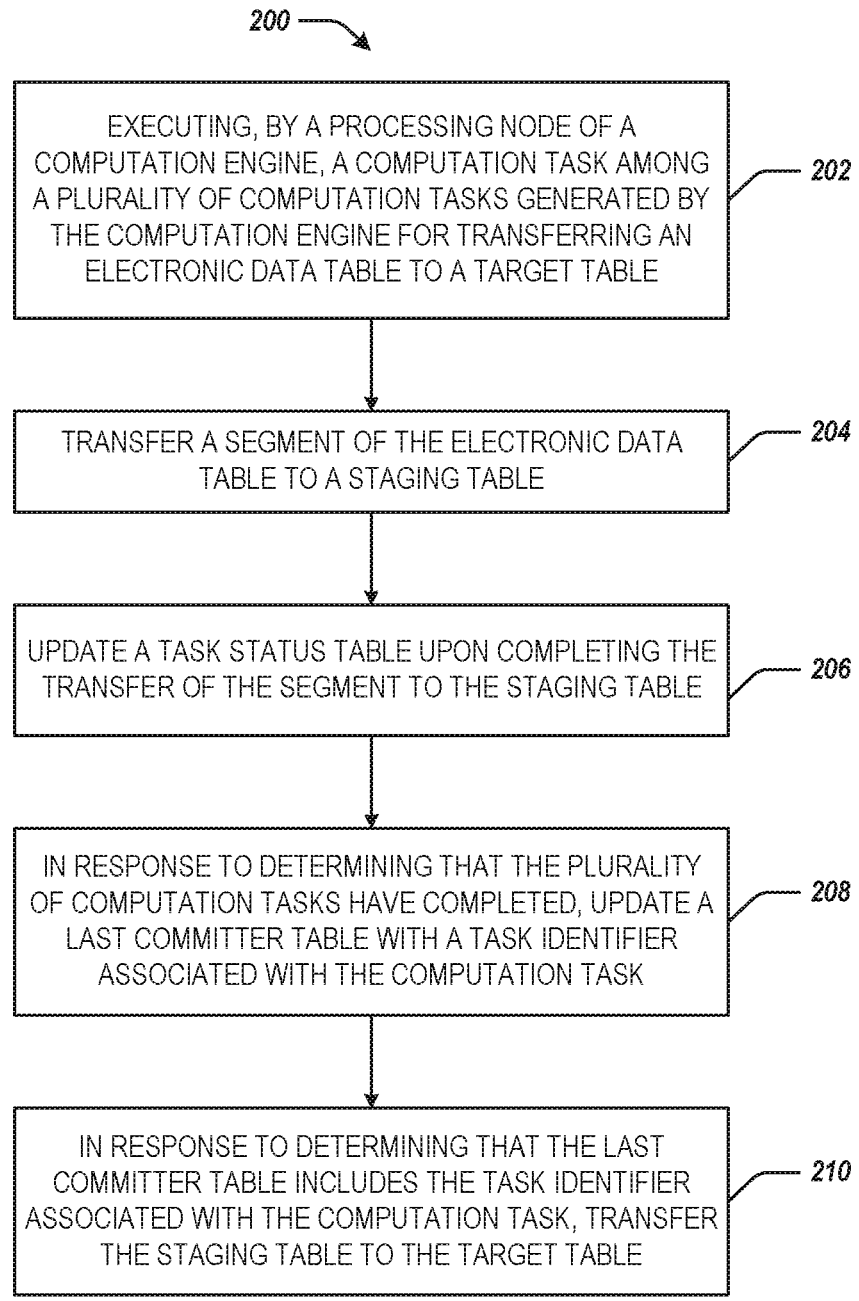
FIG. 2 is a flowchart of an example method for parallel transfers of electronic data.

FIG. 2 is a flowchart depicting an example method 200 for parallel transfers of electronic data. Method 200 may be executed or performed, for example, by some or all of the system components described above in system 100 of FIG. 1. Other suitable computing systems may be used as well. Method 200 may be implemented in the form of executable instructions stored on at least one machine-readable storage medium of the system and executed by at least one processor of the system. Alternatively or in addition, method 200 may be implemented in the form of electronic circuitry (e.g., hardware). In some examples, steps of method 200 may be executed substantially concurrently or in a different order than shown in FIG. 2. In some examples, method 200 may include more or less steps than are shown in FIG. 2. In some examples, some of the steps of method 200 may, at certain times, be ongoing and/or may repeat.

At block 202, method 200 may include executing, by a processing node of a computation engine, a computation task among a plurality of computation tasks generated by the computation engine for transferring an electronic data table to a target table. Referring back to FIG. 1, any one of processing nodes 123A-123n of computation engine 120 may be responsible for implementing block 202.

At block 204, the computation task, when executed by the processing node, may cause the processing node to transfer a segment of the electronic data table to a staging table. At block 206, the computation task, when executed by the processing node, may cause the processing node to update a task status table upon completing the transfer of the assigned segment to the staging table. At block 208, the computation task, when executed by the processing node, may cause the processing node to, in response to determining that the plurality of computation tasks have completed, update a last committer table with a task identifier associated with the computation task. At block 210, the computation task, when executed by the processing node, may cause the processing node to, in response to determining that the last committer table includes the task identifier associated with the computation task, transfer the staging table to the target table.

Figure 3:
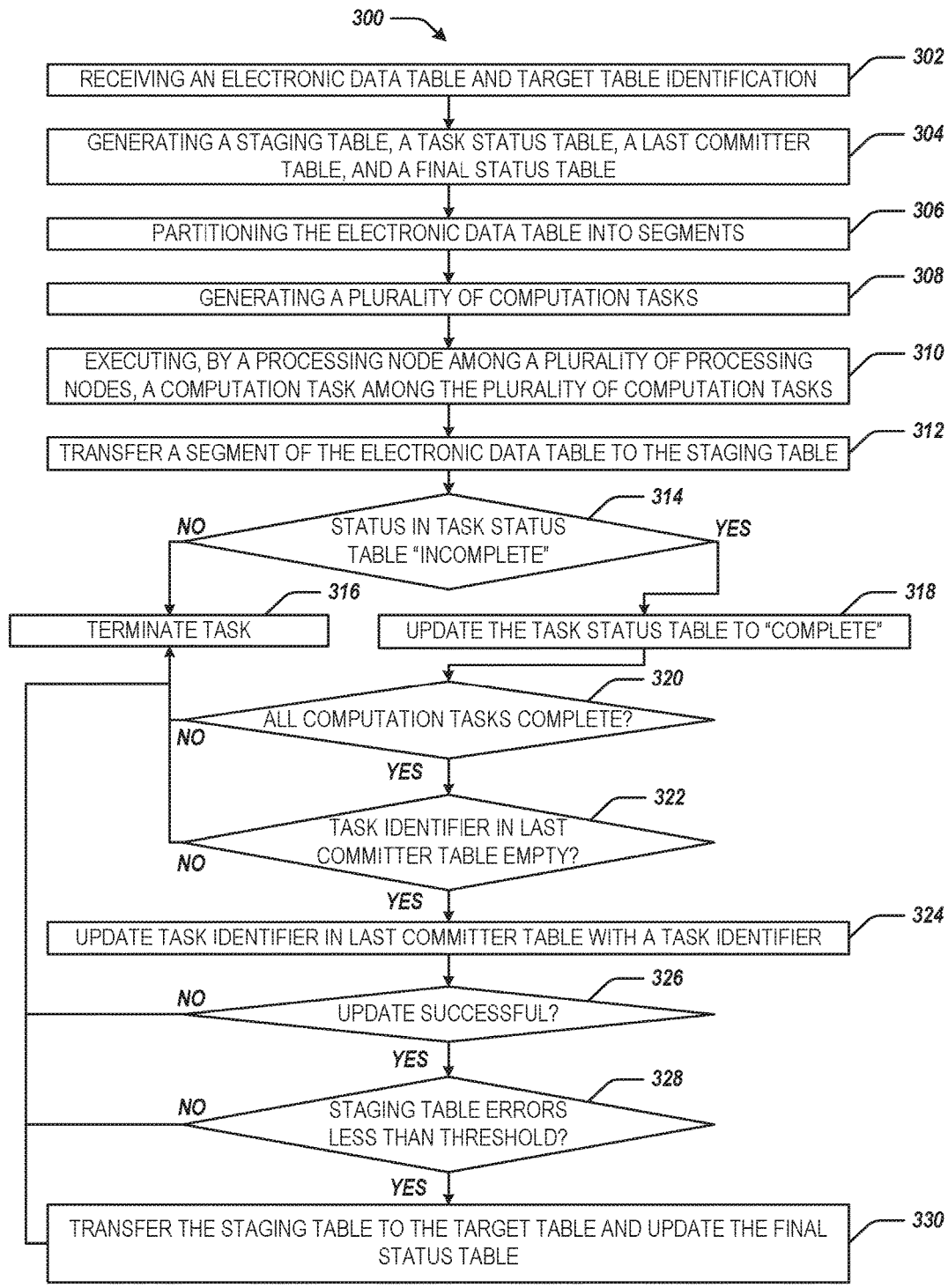
FIG. 3 is a flowchart of an example method for parallel transfers of electronic data.

FIG. 3 is a flowchart depicting an example method 300 for parallel transfers of electronic data. Method 300 may be executed or performed, for example, by some or all of the system components described above in system 100 of FIG. 1. Other suitable computing systems=may be used as well. Method 300 may be implemented in the form of executable instructions stored on at least one machine-readable storage medium of the system and executed by at least one processor of the system. Alternatively or in addition, method 300 may be implemented in the form of electronic circuitry (e.g., hardware). In some examples, steps of method 300 may be executed substantially concurrently or in a different order than shown in FIG. 3. In some examples, method 300 may include more or less steps than are shown in FIG. 3. In some examples, some of the steps of method 300 may, at certain times, be ongoing and/or may repeat.

At block 302, method 300 may include receiving an electronic data table and a target table identifier. Referring back to FIG. 1, I/O 110 of system 100 may be responsible for implementing block 302. The electronic data table and target table identifier may be received from an application or subsystem of the system (i.e., system 100), another system, or a user.

At block 304, method 300 may include generating a staging table, a task status table, a last committer table, and a final status table. Referring back to FIG. 1, computation engine 120 of system 100 may be responsible for implementing block 304.

At block 306, method 300 may include partitioning the electronic data table received at 302 into segments. Referring back to FIG. 1, table partitioner 121 of computation engine 120 may be responsible for implementing block 306.

At block 308, method 300 may include generating a plurality of computation tasks. Referring back to FIG. 1, table generator 122 of computation engine 120 may be responsible for implementing block 308. The computation tasks may be generated to transfer segments of the electronic data table to the identified target table.

At block 310, method 300 may include executing, by a processing node among a plurality of processing nodes of the computation engine, a computation task among the plurality of computation tasks. Referring back to FIG. 1, processing nodes 123A-123n of computation engine 120 may be responsible for implementing block 310.

At block 312, the computation task, when executed by the processing node, may cause the processing node to transfer a segment of the electronic data table to the staging table. If the computation task fails while the segment is being transferred to the staging table, the processing node may be capable of restarting the computation task to ensure a successful transfer of the segment to the staging table. In some examples, the processing node may restart the computation task as many times as needed until the processing node successfully transfers the segment to the staging table.

In some examples, the processing node may restart the computation task a specified number of times before terminating the computation task.

At block 314, the computation task, when executed by the processing node, may cause the processing node to determine whether the status of the computation task in the task status table is set to "Incomplete."

At block 316, the computation task, when executed by the processing node, may cause the of processing node to abort the transfer of the segment to the staging table and to terminate the computation task in response to determining that the status of the computation task in the task status table is not set to "Incomplete" (block 314—NO).

At block 318, the computation task, when executed by the processing node, may cause the processing node to update the status of the computation task in the task status table to "Complete" in response to determining that the status of the computation task in the task status table is set to "Incomplete" (block 314—YES).

At block 320, the computation task, when executed by the processing node, may cause the processing node to determine whether the statuses of the plurality of computation tasks in the task status table are set to "Complete." If the processing node determines that not all computation task statuses are set to "Complete" (block 320—NO), method 300 may proceed to block 316 where the computation task, when executed by the processing node, may cause the processing node to terminate the computation task.

At block 322, the computation task, when executed by the processing node, may cause the processing node to determine whether a task identifier field in the last committer table is empty in response to determining that the statuses for the plurality of computation tasks in the task status table are set to "Complete" (block 320—YES). If the processing node determines that the task identifier field in the last committer table is not empty (block 322—NO), method 300 may proceed to block 316 where the computation task, when executed by the processing node, may cause the processing node to terminate the computation task.

At block 324, the computation task, when executed by the processing node, may cause the processing node to update the task identifier field in the last committer table with an identifier associated with the computation task in response to determining that the task identifier field in the last committer table is empty (block 322—YES).

At block 326, the computation task, when executed by the processing node, may cause the processing node to determine whether the processing node was successful in updating the task identifier field in the last committer table with the identifier associated with the computation task. The processing node may determine whether the processing node was successful in updating the task identifier field in the last committer table with the identifier associated with the computation task by determining whether the task identifier field in the last committer table includes the identifier associated with the computation task. If the task identifier field in the last committer table includes the identifier associated with the computation task, the processing node was successful in updating the task identifier field in the last committer table (block 326—YES). If the task identifier field in the last committer table includes an identifier associated with another computation task or does not include an identifier associated with a computation task, the processing node was not successful in updating the task identifier field in the last committer table (block 326—NO).

If the processing node determines that it was not successful in updating the task identifier field in the last committer table with the identifier associated with the computation task (block 326—NO), method 300 may proceed to block 316 where the computation task, when executed by the processing node, may cause the processing node to terminate the computation task. If the processing node determines that it was successful in updating the task identifier field in the last committer table with the identifier associated with the computation task (block 326—YES), method 300 may proceed to block 328 where the computation task, when executed by the processing node, may cause the processing node to determine whether a number of staging table errors is less than a threshold number of staging table errors.

If the processing node determines that the number of staging table errors is not less than the threshold number of staging table errors (block 328—NO), method 300 may proceed to block 316 where the computation task, when executed by the processing node, may cause the processing node to terminate the computation task. If the processing node determines that the number of staging table errors is less than the threshold number of staging table errors (block 328—YES), method 300 may proceed to block 330 where the computation task, when executed by the processing node, may cause the processing node to transfer the staging table to the target table associated with the received target table identifier and update the final status table. The final status table may be updated to reflect that the staging table was successfully transferred to the target table. If the computation task fails while the staging table is being transferred to the target table, the processing node may be capable of restarting the computation task to ensure a successful transfer of the staging table to the target table. In some examples, the processing node may restart the computation task as many times as needed until the processing node successfully transfers the staging table to the target table. In some examples, the processing node may restart the computation task a specified number of times before terminating the transfer of the staging table to the target table.

Figure 4:
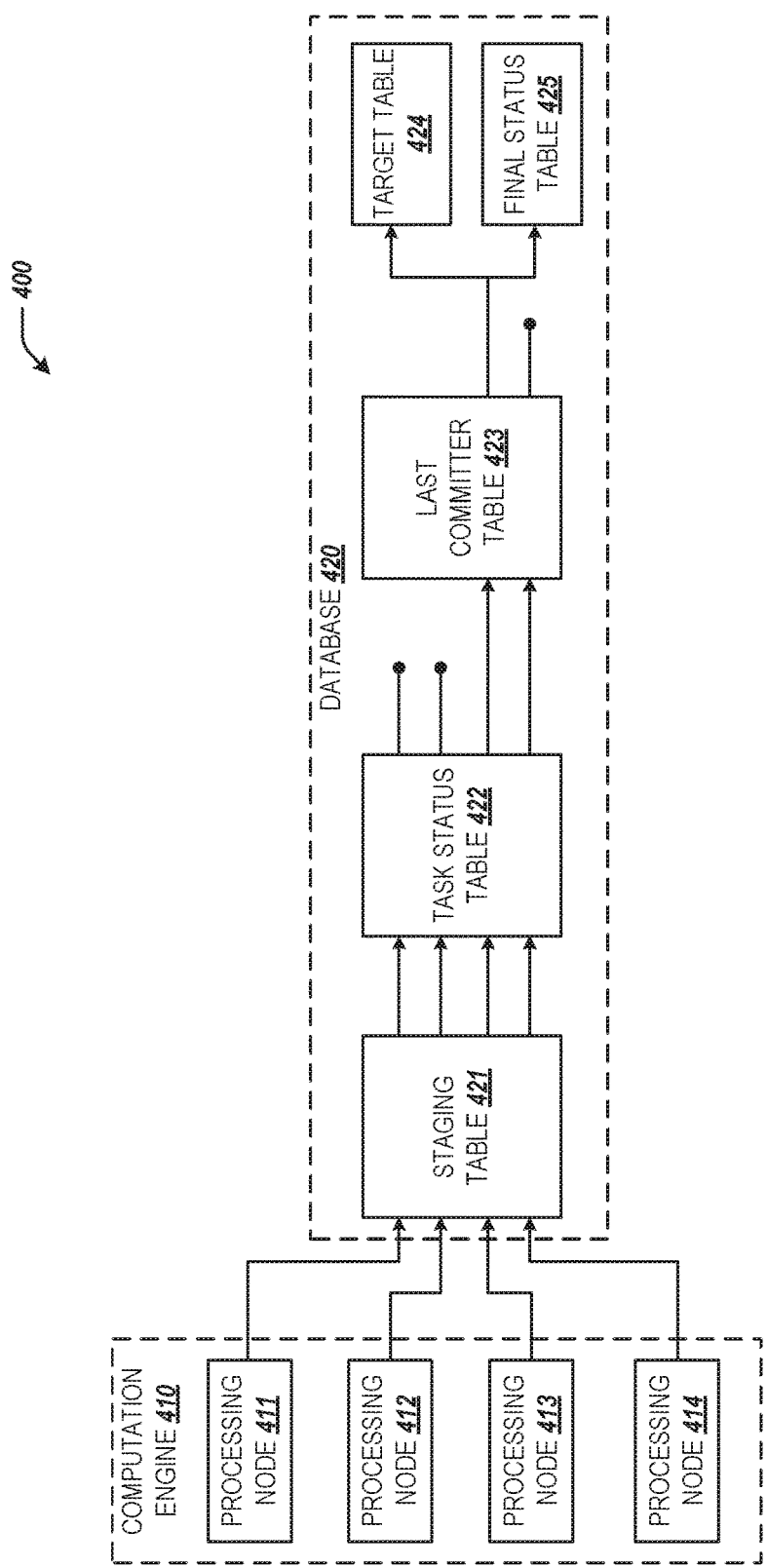
FIG. 4 is a block diagram of an example implementation of the example method illustrated in FIG. 3.

FIG. 4 is an example implementation 400 of method 300 illustrated in FIG. 3. Example implementation 400 may include a computation engine 410 and a database 420. Computation engine 410 may be implemented by computation engine 120 illustrated in FIG. 1. Database 420 may be implemented by database 130 illustrated in FIG. 1.

In example implementation 400, an electronic data table and a target table identifier may be received and provided to computation engine 410. The target table identifier may be an identifier associated with target table 424 included in database 420. In response to receiving the electronic data table and target table identifier, computation engine 410 may generate a staging table 421, a task status table 422, a last committer table 423, and a final status table 425 in database 420. Staging table 421, task status table 422, last committer table 423, target table 424, and final status table 425 may be implemented by staging table 131, task status table 132, last committer table 133, target table 134, and final status table 135, respectively.

Computation engine 410 may partition the received electronic data table into segments and generate a plurality of computation tasks to transfer the segments to target table 424. Computation engine 410 may assign the generated computation tasks to processing nodes 411-414. Processing nodes 411-414 may be implemented by processing nodes 123A-123n of FIG. 1.

Processing nodes 411-414 may execute their assigned computation task. The assigned computation tasks, when executed by processing nodes 411-414, may cause processing nodes 411-414 to transfer a segment of the electronic data table to staging table 421 and update task status table 422 to reflect that processing nodes 411-414 have completed their assigned computation tasks.

The assigned computation tasks, when executed by processing nodes 411-414, may cause processing nodes 411- 414 to check task status table 422 to determine whether all of the assigned computation tasks have been completed. In example implementation 400, processing nodes 411 and 412 have determined, based upon checking task status table 422, that not all of the assigned computation tasks have been completed and have therefore terminated their assigned computation tasks.

Processing nodes 413 and 414, however, have determined, based upon checking task status table 422, that all of the assigned computation tasks have been completed. Accordingly, the computation tasks assigned to processing nodes 413 and 414 continue executing by causing processing nodes 413 and 414 to determine whether the task identifier field in last committer table 423 is empty.

In example implementation 400, processing node 413 has determined that the task identifier field in last committer table 423 is empty. The computation task assigned to processing node 413 therefore continues executing by causing processing node 413 to the update last committer table 423 with an identifier associated with the computation task. Processing node 414, however, has determined that that the task identifier field in last committer table 423 includes the identifier associated with the computation task executed by processing node 413. Therefore, the computation task assigned to processing node 414 causes processing node 414 to terminate the computation task.

In example implementation 400, the computation task assigned to processing node 413 causes processing node 413 to determine that the task identifier field in last committer table 423 includes the identifier associated with the computation task. In response to determining that the task identifier field in last committer table 423 includes the identifier associated with the computation task, the computation task causes processing node 413 to determine that a number of errors in staging table 421 is less than a threshold number of staging table errors, to transfer staging table 421 to target table 424, and to update final status table 425 to indicate that the transfer of staging table 421 to target table 424 was successful.

Figure 5:
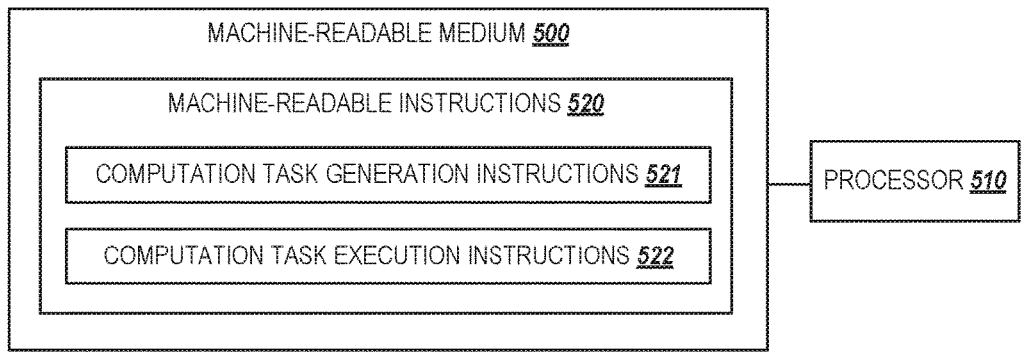
FIG. 5 is a block diagram of an example machine-readable medium for parallel transfers of electronic data.

FIG. 5 is a block diagram of an example machine-readable medium 500 for parallel transfers of electronic data. Machine-readable medium 500 may be communicatively coupled to a processor 510. Machine-readable medium 500 and processor 510 may, for example, be included as part of system 100 illustrated in FIG. 1. Although the following descriptions refer to a single processor and a single machine-readable storage medium, the descriptions may also apply to a system with multiple processors and/or multiple machine-readable storage mediums. In such examples, the instructions may be distributed (e.g., stored) across multiple machine-readable storage mediums and the instructions may be distributed (e.g., executed by) across multiple processors.

Processor 510 may be central processing units (CPUs), microprocessors, and/or other hardware devices suitable for retrieval and execution of instructions stored in machine-readable storage medium 500. In the example shown in FIG. 5, processor 510 may fetch, decode, and execute machine-readable instructions 520 (including instructions 521 and 522) for parallel transfers of electronic data. As an alternative or in addition to retrieving and executing instructions, processor 510 may include electronic circuits comprising a number of electronic components for performing the functionality of the instructions in machine-readable storage medium 500. With respect to the executable instruction representations (e.g., boxes) described and shown herein, it should be understood that part or all of the executable instructions and/or electronic circuits included within one box may, in some examples, be included in a different box shown in the figures or in a different box not shown.

Machine-readable storage medium 500 may be any electronic, magnetic, optical, or other physical storage device that stores executable instructions. Thus, machine-readable storage medium 500 may be, for example, Random Access Memory (RAM), a nonvolatile RAM (NVRAM) (e.g., RRAM, PCRAM, MRAM, etc.), an Electrically-Erasable Programmable Read-Only Memory (EEPROM), a flash memory, a storage drive, an optical disc, and the like. Machine-readable storage medium 500 may be disposed within a system (e.g., system 100 of FIG. 1). In this situation, the executable instructions may be "installed" on the system. Alternatively, machine-readable storage medium 500 may be a portable, external or remote storage medium, for example, that allows a system to download the instructions from the portable/external/remote storage medium. In this situation, the executable instructions may be part of an "installation package". As described herein, machine-readable storage medium 500 may be encoded with executable instructions for parallel transfers of electronic data.

Referring to FIG. 5, computation task generation instructions 521, when executed by a processor (e.g., 510), may cause the processor to receive a computation task. Task partitioning instructions 322, when executed by a processor (e.g., 310), may cause the processor to generate, by a computation engine, a plurality of computation tasks for transferring segments of an electronic data table to a target table. Computation task execution instructions 522, when executed by a processor (e.g., 510), may cause the processor to execute, by a processing node among a plurality of processing nodes of the computation engine, a computation task among the plurality of computation tasks. The computation task, when executed by the processing node, may cause the processing node to transfer a segment among the segments to a staging table and update a task status table upon completion of the transfer. The computation task, when executed by the processing node, may cause the processing node to determine whether the plurality of computation tasks have completed and, in response to determining that the plurality of computation tasks have completed, update a last committer table with a task identifier associated with the computation task. The computation task, when executed by the processing node, may cause the processing node to determine whether the last committer table includes the task identifier associated with the computation task and, in response to determining that the last committer table includes the task identifier associated with the computation task, determine whether a number of errors in the staging table is less than a threshold number of errors. The computation task, when executed by the processing node, may cause the processing node to in response to determining that the number of errors in the staging table is less than the threshold number of errors, transfer the staging table to the target table and update a final status table.

Figure 6:
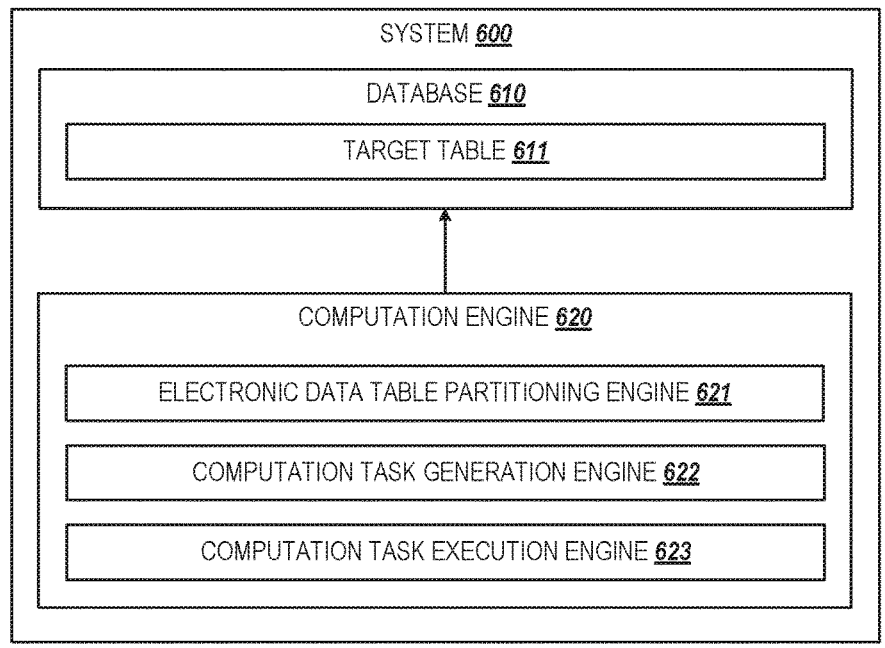
FIG. 6 is a block diagram of an example system for parallel transfers of electronic data.

FIG. 6 is a block diagram depicting an example system 600, including a database 610 and computation engine 620, for parallel transfers of electronic data. Database 610 may include a target table 611. Computation engine 620 may include an electronic data table partitioning engine 621, a computation task generation engine 622, and a computation task execution engine 623. In some examples, database 610 may be implemented by database 130 of FIG. 1. In some examples, computation engine 620 may be implemented by computation engine 120 of FIG. 1.

The term "engine", as used herein in reference to components 621-623, refers to a combination of hardware and programming that performs a designated function. For example, the hardware of each engine may include one or both of a processor and a machine-readable storage medium, while the programming is instructions or code stored on the machine-readable storage medium and executable by the processor to perform the designated function.

Referring to FIG. 6, electronic data table partitioning engine 621 may include a processor and program instructions that, when executed, cause the processor to partition a received electronic data table into segments. The electronic data table may be received, for example, from a user, from an application or subsystem of system 600, or from another system. Computation task generation engine 622 may include a processor and program instructions that, when executed, cause the processor to generate computation tasks for transferring the segments to target table 611. Computation task execution engine 623 may include a processor and program instructions that, when executed, cause the processor to execute, by a processing node of the computation engine, a computation task among the plurality of computation tasks. The computation task, when executed, may cause the processing node to transfer a segment among the segments to a staging table and update a task status table upon completing the transfer. The computation task, when executed, may cause the processing node to, in response to determining that the plurality of computation tasks have completed, update a last committer table with a task identifier associated with the computation task. The computation task, when executed, may cause the processing node to, in response to determining that the last committer table includes the task identifier associated with the computation task, determine whether a number of errors in the staging table is less than a threshold number of errors. The computation task, when executed, may cause the processing node to, in response to determining that the number of errors in the staging table is less than the threshold number of errors, transfer the staging table to target table 611.

The foregoing disclosure describes a number of example implementations for parallel transfers of electronic data. The disclosed examples may include systems, devices, computer-readable storage media, and methods for performing parallel transfers of electronic data. For purposes of explanation, certain examples are described with reference to the components illustrated in FIGS. 1-6. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 2 and 3 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The invention claimed is:

1. A method for parallel transfers of electronic data, the method comprising:
   receiving an electronic data table and an identification of a target table in a database;
   partitioning, by a processor, the received electronic data table into segments and table;
   causing, by the processor, a plurality of processing nodes to perform parallel transfers of the segments of the electronic data table to a staging table, wherein the staging table is a table where all of the segments are stored prior to being transferred together to the identified target table in the database;
   upon completing the transfer of one of the segments to the staging table, checking, by a processing node of the processing nodes that completed the transfer of the segment, statuses in a task status table to determine whether the transfers of all of the segments have completed;
   in response to determining that the transfers of all of the segments have completed, updating a last committer table with a task identifier associated with the transfer of a last segment; and
   in response to determining that the last committer table includes the task identifier associated with the computation task of transferring the last segment, transferring the staging table to the target table.

2. The method of claim 1, comprising:
   upon completing the transfer of one of the segments to the staging table, updating, by the processing node that performed the transfer of the segment, a status in the task status table to indicate that the transfer of the segment is complete.

3. The method of claim 1, comprising:
   receiving the identification of the target table via an application programming interface (API).

4. The method of claim 1, comprising:
   in response to receiving the electronic data table, generating, by the processor, the staging table, the task status table, and the last committer table.

5. The method of claim 1, further comprising: causing, by the processor, one of the processing nodes to encode one of the segments in an Avro format before transferring the segment to the staging table.

6. The method of claim 1, wherein transferring the staging table to the target table includes overwriting the target table with the staging table.

7. The method of claim 1, wherein transferring the staging table to the target table includes appending the staging table to the target table.

8. The method of claim 1, wherein transferring the staging table to the target table includes:
   determining whether a number of errors in the staging table is less than a threshold number of errors; and
   in response to determining that the number of errors in the staging table is less than the threshold number of errors, transferring the staging table to the target table.

9. A system, comprising:
   an electronic database to store a target table; and
   a computation engine, including a plurality of processing nodes, to:
   receive an electronic data table and an identification of the target table in the electronic database;

partition the received electronic data table into segments;
generate a plurality of computation tasks to transfer the segments to the identified target table;
cause the plurality of processing nodes of the computation engine to execute the computation tasks to transfer the segments to a staging table, wherein the staging table is a table where all of the segments are stored prior to being transferred together to the identified target table in the electronic database;
upon completing one of the computation tasks to transfer one of the segments, cause a processing node of the processing nodes to check statuses in a task status table to determine whether all of the computation tasks of transferring the segments have completed;
in response to determining that all of the computation tasks of transferring the segments have completed, update a last committer table with a task identifier associated with the computation task of transferring a last segment;
in response to determining that the last committer table includes the task identifier associated with the computation task of transferring the last segment, determine whether a number of errors in the staging table is less than a threshold number of errors; and
in response to determining that the number of errors in the staging table is less than the threshold number of errors, transfer the staging table to the identified target table.

10. The system of claim 9, wherein the computation engine causes one of the processing nodes to determine whether the last committer table includes the task identifier associated with the computation task of transferring the last segment.

11. The system of claim 9, wherein the computation engine causes the processing node to update the task status table to include the task identifier associated with the computation task of transferring the segment, a segment identifier, a number of errors that occurred while transferring the segment to the staging table, and a task completion status.

12. The system of claim 11, wherein the computation engine causes the processing node to determine whether the number of errors in the staging table is less than the threshold number of errors by:
determining, based on the task status table, an aggregated number of errors that occurred during the transfers of all of the segments; and
comparing the aggregated number of errors to the threshold number of errors.

13. The system of claim 9, wherein the computation engine causes one of the processing nodes to, in response to determining that the number of errors in the staging table is greater than or equal to the threshold number of errors:
abort the transfer of the staging table to the target table; and
update a final status table to indicate that the transfer of the staging table to the target table was unsuccessful.

14. The system of claim 9, wherein to transfer the staging table to the target table, the computation engine is to overwrite the target table with the staging table or append the staging table to the target table.

15. A non-transitory machine-readable storage medium storing instructions that, when executed by a processor, cause the processor to:
receive an electronic data table and an identification of a target table in a database;
partition the received electronic data table into segments;
generate, a plurality of computation tasks for transferring segments of the electronic data table to the target table;
cause a plurality of processing nodes to execute the plurality of computation tasks to transfer the segments to a staging table, wherein the staging table is a table where all of the segments are stored prior to being transferred together to the target table in the database;
upon completion of one of the computation tasks of transferring one of the segments to the staging table, cause a processing node of the processing nodes that completed the transfer of the segment to determine whether all of the computation tasks of transferring the segments have completed;
in response to determining that all of the computation tasks of transferring the segments have completed, update a last committer table with a task identifier associated with the computation task of transferring a last segment;
in response to determining that the last committer table includes the task identifier associated with the computation task of transferring the last segment, determine whether a number of errors in the staging table is less than a threshold number of errors; and
in response to determining that the number of errors in the staging table is less than the threshold number of errors, transfer the staging table to the target table and update a final status table to reflect the transfer of the staging table to the target table is complete.

16. The non-transitory machine-readable storage medium of claim 15, wherein the instructions that cause the processor to transfer the staging table to the target table include instructions that cause the processor to identify the target table based on the identification of the target table.

17. The non-transitory machine-readable storage medium of claim 15, wherein the instructions that cause the processor to transfer the staging table to the target table include instructions that cause the processor to overwrite the target table with the staging table.

18. The non-transitory machine-readable storage medium of claim 15, wherein the instructions that cause the processor to transfer the staging table to the target table include instructions that cause the processor to append appending the staging table to the target table.

19. The non-transitory machine-readable storage medium of claim 15, wherein the instructions that cause the processor to update the final status table include instructions that cause the processor to update the final status table to reflect a status of the transfer of the staging table to the target table.

* * * * *